(12) United States Patent
Tsukahara et al.

(10) Patent No.: US 10,438,399 B2
(45) Date of Patent: Oct. 8, 2019

(54) PAIRED LOCAL AND GLOBAL USER INTERFACES FOR AN IMPROVED AUGMENTED REALITY EXPERIENCE

(71) Applicant: Sony Interactive Entertainment LLC, San Mateo, CA (US)

(72) Inventors: Tsubasa Tsukahara, San Mateo, CA (US); Anthony Rogers, San Mateo, CA (US); Hironobu Aoki, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 14 days.

(21) Appl. No.: 15/429,781

(22) Filed: Feb. 10, 2017

(65) Prior Publication Data

US 2018/0232941 A1    Aug. 16, 2018

(51) Int. Cl.
*G06T 15/20*        (2011.01)
*G02B 27/00*        (2006.01)
(Continued)

(52) U.S. Cl.
CPC .......... *G06T 15/20* (2013.01); *G02B 27/0093* (2013.01); *G02B 27/017* (2013.01); *G06F 1/163* (2013.01); *G06F 3/011* (2013.01); *G06F 3/012* (2013.01); *G06F 3/013* (2013.01); *G06F 3/017* (2013.01); *G06F 3/04815* (2013.01); *G06F 3/04842* (2013.01); *G06F 3/04845* (2013.01); *G06T 11/00* (2013.01); *G06T 19/006* (2013.01); *G02B 2027/014* (2013.01); *G02B 2027/0138* (2013.01); *G02B 2027/0141* (2013.01); *G02B 2027/0187* (2013.01); *G06T 7/70* (2017.01)

(58) Field of Classification Search
CPC .................. G06F 3/0346; G06F 3/011; G06F 2203/04806; G06F 3/016; G06F 3/017; G06F 3/0338; G06F 3/0414; G06F 2203/0381; G06F 3/005; G06F 3/013; G06F 3/04842; G06T 19/006; G06T 2207/30204; G06T 7/11; G06T 2207/10016; G06T 2207/10021; G06T 2207/30208; G06T 2219/024; G06T 7/00; G06T 7/74
See application file for complete search history.

(56) References Cited

U.S. PATENT DOCUMENTS

2003/0020707 A1*  1/2003  Kangas .................. G06F 3/011
                                                               345/418
2008/0030428 A1*  2/2008  Tomisawa .......... G02B 27/2214
                                                                 345/6

(Continued)

*Primary Examiner* — Sultana M Zalalee
(74) *Attorney, Agent, or Firm* — Trellis IP Law Group, PC

(57) ABSTRACT

Methods, systems and user interfaces enhance an augmented reality experience of a user having freedom of movement within an external environment. A local user interface is created and displayed to the user in a first viewable region. A global user interface is created and displayed to the user in a second viewable region, further from the user than the first viewable region. The local user interface is maintained at a first spatial position, the first spatial position being stationary with respect to a part of the user's body; and the global user interface is maintained at a second spatial position, the second spatial position being stationary with respect to the external environment.

19 Claims, 4 Drawing Sheets

(51) Int. Cl.
  *G02B 27/01*    (2006.01)
  *G06F 3/01*     (2006.01)
  *G06F 3/0481*   (2013.01)
  *G06F 3/0484*   (2013.01)
  *G06T 19/00*    (2011.01)
  *G06F 1/16*     (2006.01)
  *G06T 11/00*    (2006.01)
  *G06T 7/70*     (2017.01)

(56)      References Cited

U.S. PATENT DOCUMENTS

| | | | | |
|---|---|---|---|---|
| 2008/0126928 | A1* | 5/2008 | de Leon | G06F 3/0481 715/700 |
| 2010/0207950 | A1* | 8/2010 | Zhao | G06T 13/00 345/473 |
| 2013/0307875 | A1* | 11/2013 | Anderson | G06T 19/006 345/633 |
| 2013/0335303 | A1* | 12/2013 | MacIocci | G06F 3/011 345/8 |
| 2014/0002457 | A1* | 1/2014 | Swindell | G06T 15/20 345/426 |
| 2014/0143732 | A1* | 5/2014 | Haussila | G06F 3/0481 715/845 |
| 2015/0085076 | A1* | 3/2015 | Lockhart | G06F 3/048 348/46 |
| 2015/0177518 | A1* | 6/2015 | Wong | G02B 27/017 345/633 |
| 2015/0317831 | A1 | 11/2015 | Ebstyne et al. | |
| 2016/0026253 | A1* | 1/2016 | Bradski | G02B 27/225 345/8 |
| 2016/0063762 | A1 | 3/2016 | Heuvel et al. | |
| 2016/0109952 | A1* | 4/2016 | Wu | G06F 3/017 715/863 |
| 2016/0210784 | A1 | 7/2016 | Ramsby et al. | |

* cited by examiner

PAIRED LOCAL AND GLOBAL USER INTERFACES FOR AN IMPROVED AUGMENTED REALITY EXPERIENCE

BACKGROUND

One category of user interfaces for augmented reality systems is made up of viewable virtual images generated by specialized optical display devices. In some cases, the devices are mounted on or around the user's head; in other cases, the devices may be hand-held devices such as smartphones. The user typically interacts with one or more image elements in the user interface by making gestures like pointing, swiping, or other controlled movements of a finger, hand, or arm.

Current augmented reality systems of this sort typically create one or more virtual images making up a single interface viewable by the user. In the case of a head-mounted display device, the system controller achieves this by controlling pixels of the display device, through which the user observes the external environment. The image or images making up the user interface appear to the user to be positioned at some distance beyond the display screen, but close enough to be conveniently manipulated as desired. Current systems also typically employ some means to track the position of a particular part of the user's body and move the user interface correspondingly, so that the interface remains stationary with respect to that body part. This allows the user to conveniently view and interact with the interface regardless of changes in the user's own position. In many cases, it is the user's head position which is tracked, so that even when the head is tilted or rotated, the user interface is presented at a convenient orientation for, and distance from, the user's eyes. In some other cases, the user's waist position may be tracked, so that when the user walks from one position to another, the user interface moves correspondingly, remaining close to the user.

However, one can envisage augmented reality applications, whether in education, business, or play, where it it would be helpful to provide a second user interface made up of one or more virtual images located in the external environment at positions that are fixed or stationary with respect to physical objects or features of that environment, regardless of changes in the user's position. A related desirable feature would be a means of allowing the user to cause an image to be shifted either from the first standard user interface, which may be termed a "local" interface, where the image is effectively tied to the user, to the second or "global" user interface, where the image is effectively tied to the external environment, or in the opposite direction, from the global interface to the local interface.

The tracking and interpretation of user gestures in currently available augmented reality systems generally depends on the use of infrared projectors and infra red cameras to capture the necessary information on depth, shape, and motion. This limits the field of use of these systems to relatively low ambient light environments, usually indoors, rather than very brightly light or naturally bright outdoor environments. Such systems could potentially be significantly improved if the information of interest could be collected without the use of IR imaging, allowing the systems to be used successfully outdoors as well as indoors.

There is, therefore, a need for improved augmented reality systems and methods that provide the user with paired local and global user interfaces that the user can conveniently and intuitively interact with, in indoor or outdoor environments over a wide range of ambient light levels. It would be desirable to enable the user to move images as desired between the two interfaces, but the default state of the images in the local interface would be to remain stationary with respect to the user's body or head, and the default state of images in the global interface would be to remain stationary with respect to the external physical environment. Another desirable feature would be to allow the user to easily change viewable aspects, such as shape size, or dimensionality (2D or 3D) of images in either one or both of the local and global interfaces.

SUMMARY

Embodiments of the present invention generally relate to methods, systems and user interfaces for enhancing an augmented reality experience of a user having freedom of movement within an external environment. In one embodiment, the method comprises creating a local user interface and displaying the local user interface to the user in a first viewable region; and creating a global user interface and displaying the global user interface to the user in a second viewable region, further from the user than the first viewable region. The local user interface is maintained at a first spatial position, the first spatial position being stationary with respect to a part of the user's body; and the global user interface is maintained at a second spatial position, the second spatial position being stationary with respect to the external environment.

In one aspect, the local user interface comprises a first virtual image element, and wherein in response to the user selecting the first virtual image element and indicating by a gesture a desired position in the external environment, a corresponding second virtual image element is created and displayed in the global user interface at the desired position, as viewed by the user.

In another aspect, the global user interface comprises a first virtual image element, and wherein in response to the user selecting the first virtual image element and indicating by a gesture a desired position in the first viewable region, a corresponding second virtual image element is created and displayed in the local user interface at the desired position, as viewed by the user.

In one embodiment, the system comprises a display; and at least one processor coupled to the display. The processor or processors are configured to create a local user interface, and control the display to provide the local user interface to the user in a first viewable region; to create a global user interface, and control the display to provide the global user interface to the user in a second viewable region, further from the user than the first viewable region; and, in response to movements of the user, further control the display to maintain the local user interface at a first spatial position, the first spatial position being stationary with respect to a part of the user's body; and to maintain the global user interface at a second spatial position, the second spatial position being stationary with respect to the external environment.

A further understanding of the nature and the advantages of particular embodiments disclosed herein may be realized by reference of the remaining portions of the specification and the attached drawings.

DETAILED DESCRIPTION OF EMBODIMENTS

Embodiments described herein enable a user to quickly and intuitively interact with an augmented reality system, which augments the external environment of the user with virtual images that may be either in a local user interface, or in a global user interface, paired with the local user interface. Embodiments generally relate to providing the paired user interfaces to the user in such a way that the local user interface remains stationary with respect to a part of the user's body, while the global user interface remains stationary with respect to the external environment.

The main issue addressed by embodiments of the present invention is that the user of current augmented reality systems is generally unable to position virtual images in space in relation to features of the external environment, as the single user interface provided remains close to the user and typically follows the motion of a part of the user's body (typically the head). All the virtual images therefore "move" along with the user's body. The current invention, however, provides paired local and global user interfaces, operatively coupled so that the user can not only conveniently interact with images in the local interface but can also interact with other images that are tethered to, or positioned in relation to, features of the external environment, rather than to the user's body.

Figure 1:
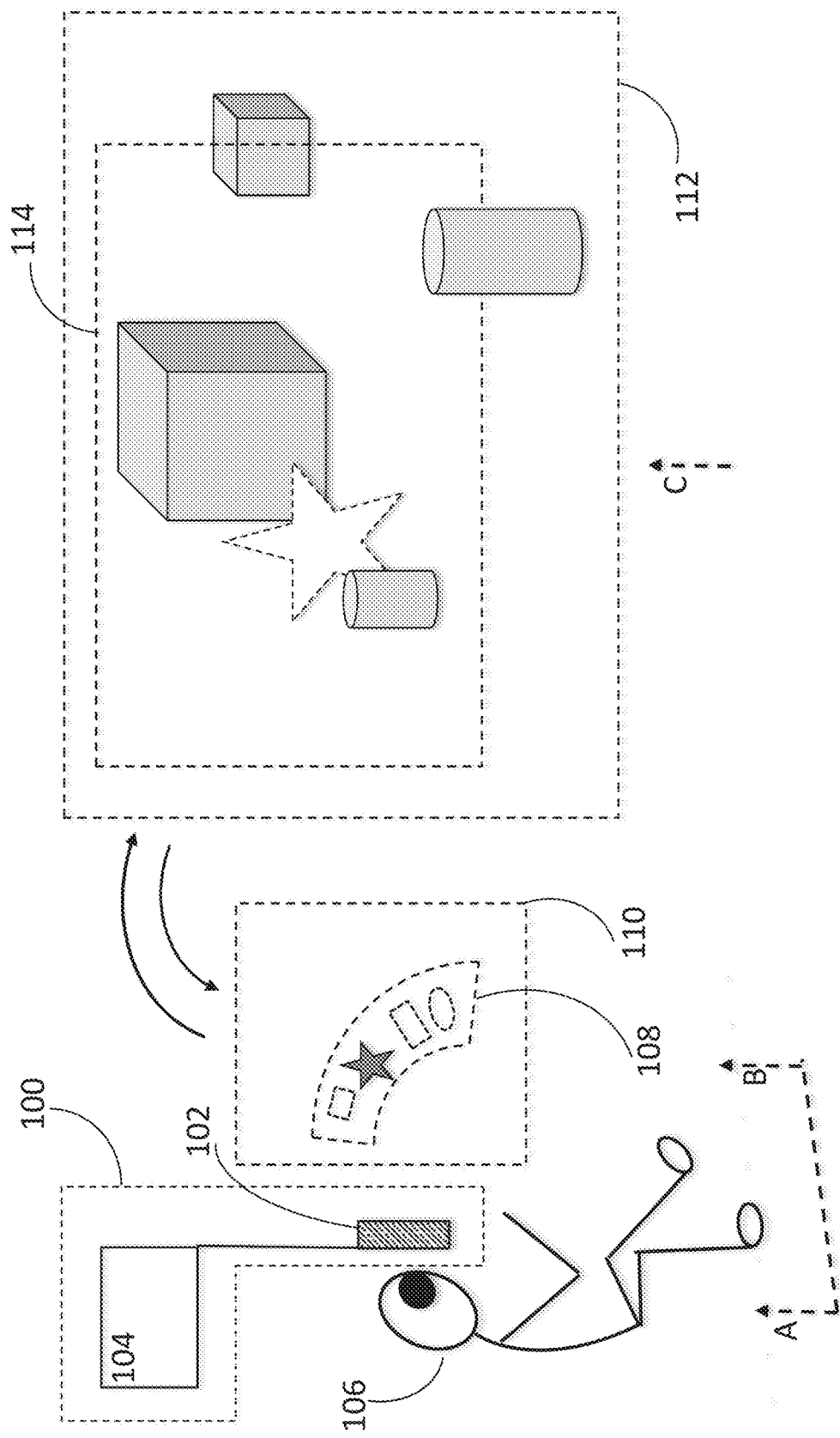
FIG. 1 is a representation of an augmented reality system according to one embodiment.

FIG. 1 is a schematic representation of an augmented reality system 100 in operation according to some embodiments of the present invention. Processor 104 is operably connected (usually by a wired connection) to display device 102, which may take the form of eye glasses or goggles, positioned in the line of sight of user 106. Processor 104 creates virtual local user interface 108 and controls display device 102 to provide that interface in viewable region 110. Region 110 is situated in front of and close to user 106, so that user 106 can easily select and activate elements of interface 108 as desired, by gestures such as pointing, twisting etc. In some embodiments, the gestures may include direct manipulation of physical devices such as knobs, joysticks, etc rather than, or in addition to, gestures in free space. In some embodiments, the user's gaze direction may be determined (using a camera aimed at the user's face) as an alternative to observing and interpreting gestures as the user's means of interacting with the user interface.

Processor 104 also creates virtual global user interface 114 and controls display device 102 to provide that interface in viewable region 112. Region 112 is situated further from the user than region 110, in the external environment that generally includes real 3-dimensional objects, some lying behind region 112, while others lie in front of it, as perceived by the user. Simple cubes and cylinder shapes are shown in the figure, for convenience, to represent any of an infinite variety of real-world objects such as items of furniture, books, toys, etc. User 106 may interact with elements of global interface 114 in the same way as described above with regard to local interface 108.

Processor 104 controls the positioning of local interface 108 such that it remains stationary with respect to the user even while the user changes position. This is achieved by tracking a part of the user's body, typically the head, and controlling the display device to change the position of the interface 108 correspondingly. If the user turns his head to the right, for example, interface 108 is rotated to match; if the user juts his head forward or back, or tilts it, interface 108 may be displaced or tilted correspondingly. In some embodiments, all six degrees of freedom for the user's head (along x, y, and z axes, and rotation about yaw, pitch and roll axes) may be tracked and used to control the position and orientation of the local interface correspondingly.

In some embodiments, another part of the body may be tracked. There may, for example, be a sensor at the user's waist providing tracking information to the processor, so that as user 106 walks around a room, local user interface 108 moves too, keeping pace with, and effectively "tethered" to the user.

The positions of user 106 and local interface 108 are roughly indicated in the figure by vertical dashed lines A and B respectively, with the slanted dashed line between the vertical lines indicating the "tethered" relationship between those positions. As noted above, processor 104 operates in conjunction with a sensor (not shown) tracking the user and with display device 102, to maintain the distance between the two positions at a fixed, predetermined value, and to adjust one or more of yaw, pitch and roll as necessary. The position of global user interface 112 is roughly indicated in the figure by vertical dashed line C. Note that there is no positional "tethering" between interfaces 108 and 112, or between interface 112 and the user, but there is a strong functional or operational relationship between the pair of interfaces, as indicated by the pair of curved arrows. This relationship will be described in greater detail below.

Figure 2:
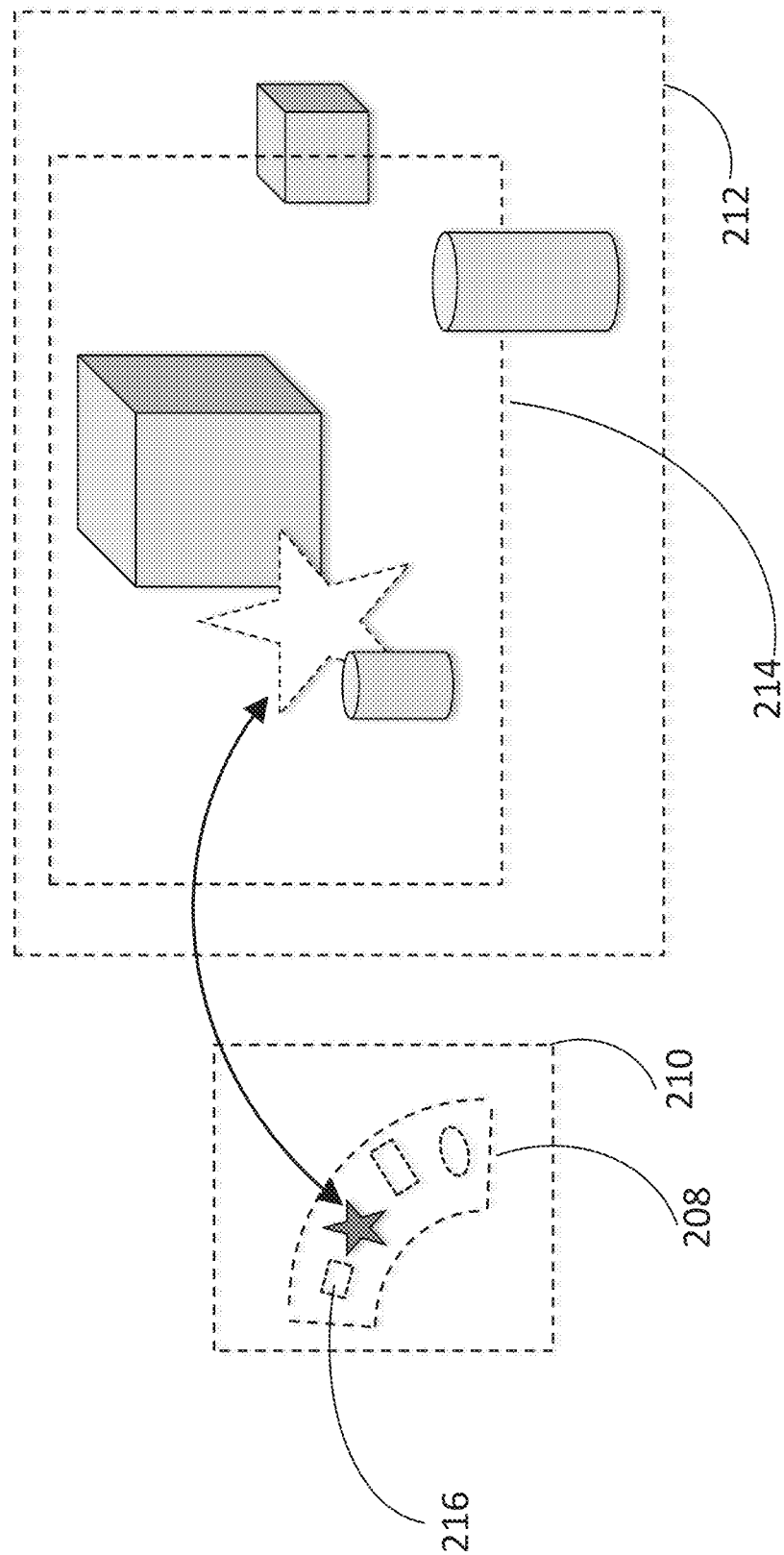
FIG. 2 is a representation of the local and global user interfaces according to one embodiment.

FIG. 2 is a schematic representation of virtual local and global user interfaces 208 and 214 generated and maintained by an augmented reality system embodiment of the present invention. Local user interface 208 (in viewable region 210) is shown with several differently shaped virtual image elements or icons 216. In some embodiments, two or more image elements 216 may be of the same shape and size, but coded in some way, for example with a textual symbol, or by color, to distinguish them and indicate their individual functions to the user. In the case shown in the figure, one image element in interface 214 is a star shape, and selection of that image element by the user may result in the generation of a corresponding star shaped image element in global user interface 214, within viewable region 212. The star image element in the global interface is shown as 2-dimensional, of a particular size and color or surface pattern, but the system may offer the user many options, such as making the star image element 3-dimensional, changing its size, color, opacity etc.

Another set of options may allow the user to control aspects of motion of the image elements created in global interface 214. The star image element, for example, may be made to appear to maneuver around the actual physical objects in viewable region 210, partly or wholly disappearing behind an object and then reappearing, or to "bounce" off an object, or to break into pieces on colliding with an object. Many other related options may readily be envisaged.

These visual effects may be initiated by gestural interaction between the user and elements of local interface 208, or by gestural interaction between the user and global interface 214. The gestures are detected by image processing carried out on real images captured by two or more cameras mounted on the display device. In some applications, where the user is hearing music through the augmented reality system or is playing an immersive game with sound effects, audio characteristics, such as volume, pitch, or apparent location of a sound source, may also be adjusted or controlled by user gestures.

In some embodiments, aspects of the appearance and motion of images in viewable region 212, and/or audio associated with those images, may be automatically controlled by the processor, without requiring direct input from the user. Audio effects relating to those images may also be automatically controlled.

The locations of the actual objects in viewable region 210 may be determined with the use of one or more cameras. Using two laterally offset cameras allows 3-dimensional position of an object from the user's location to be determined very conveniently in real time, using essentially the same principles of parallax used by the human visual system to determine depth. This is preferable to embodiments where a single camera provides depth information, as it avoids the need for two time-sequential image captures for each determination.

In some embodiments, a gesture of the user interacting with an image element in global user interface 214 may be detected by cameras and interpreted by image processing, causing a corresponding image element to be generated in local interface 208. This possibility (of actions in the global interface causing effects in the local interface, rather than, or as well as, the reverse process) is indicated by the double headed arrow in the figure, showing that, in one example, selection of the star image element in interface 214 may result in the generation of a corresponding star image element in interface 208. Either image element may be created in 2-dimensional or 3-dimensional form, and may be changed from one to the other in either of the paired local and global interfaces.

In some cases, where an image element generated in the global interface is 3-dimensional, if the user changes position and orientation, data provided by tracking sensors on the user may be analyzed by the system processor or processors and used to control the display device to generate correspondingly different views of the virtual object represented by the image element in the global interface. If, for example, the image element is initially perceived by the user as a playing card with its front face fully viewable by the user, and then the user turns his head, the card will seem to remain in its initial position, relative to any fixed objects in the external environment, but the edge of the card, or even its back face may be seen.

In other cases, where an image element generated in the global interface is 3-dimensional, and changes its position and/or orientation, correspondingly different features of the second image element are perceived by the user. The changes in position and/or orientation may occur in response to control, either by the user interacting with the global user interface or by software running the augmented reality experience for the user. In the former case, the interactions are typically gestures, images of which are captured by cameras, interpreted by image processing, and used to control the display device correspondingly.

Figure 3:
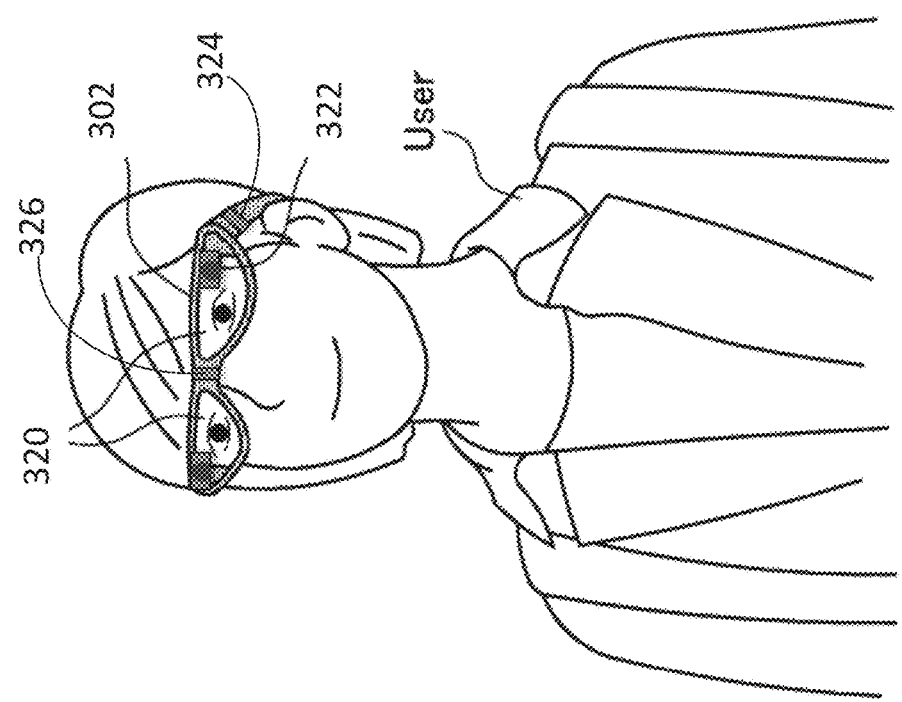
FIG. 3 is a representation of the head mounted display of a system according to one embodiment.

FIG. 3 is a schematic representation of head mounted display device 302, including a display screen 320 and cameras 322. In some particularly desirable embodiments, display screen 320 uses organic light-emitting diode (OLED) technology, including waveguide optics and/or bulk optical elements to focus and guide light from organic LEDs. In other embodiments, other types of light sources and optics may be used. Head position sensor 324 and head orientation sensor 326 are shown integrated into display device 302, although in some embodiments, one or both of these may be separately mounted on other supports, worn by the user.

Figure 4:
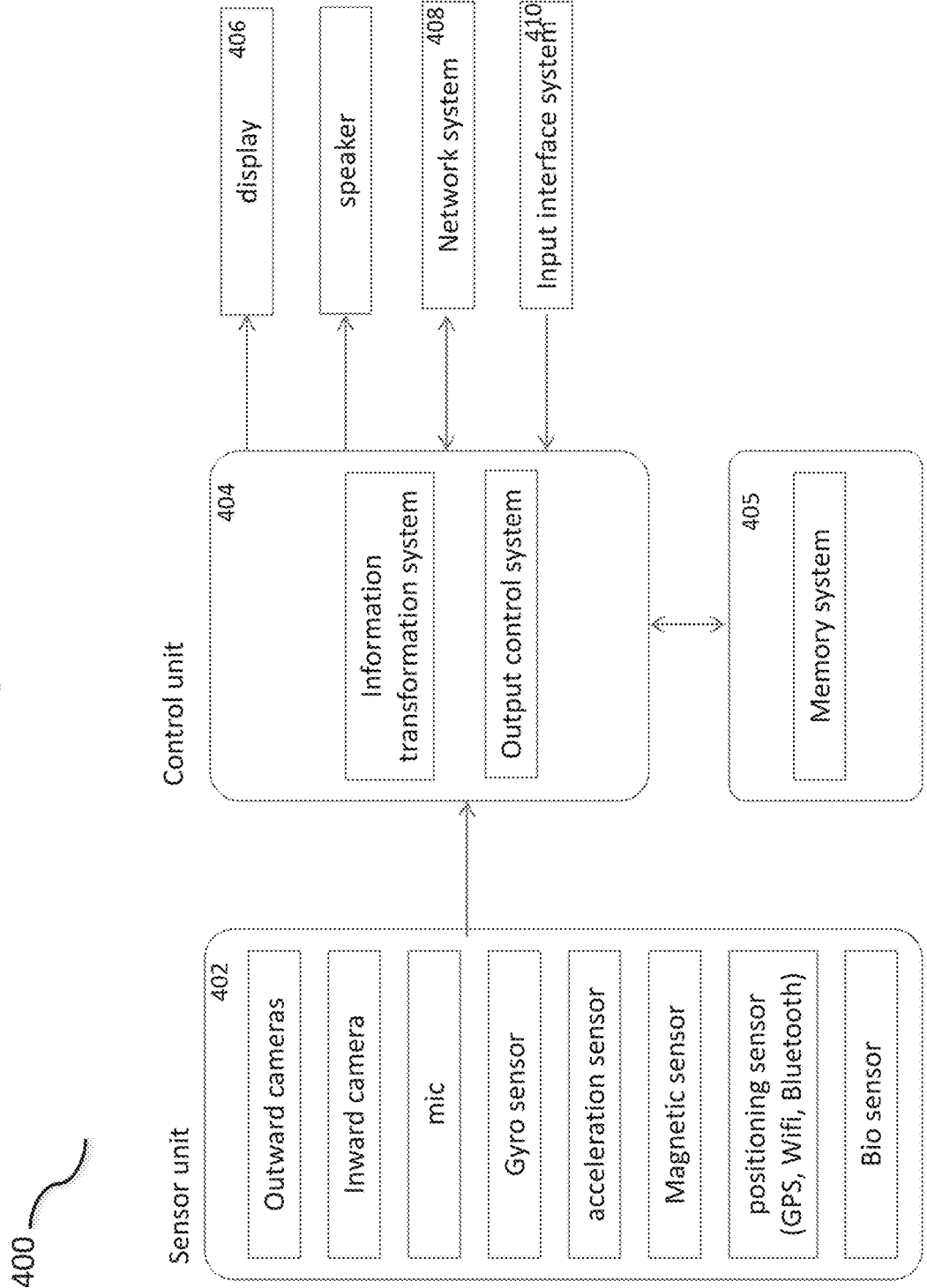
FIG. 4 is a schematic block diagram of an augmented reality system according to one embodiment.

FIG. 4 is a schematic block diagram of an augmented reality system 400. System 400 includes sensor unit 402, which in turn comprises two outward-facing cameras (allowing real time determination of object position in three dimensions, as discussed above) a position-determining sensor, which may depend on GPS, WiFi, Bluetooth, or other well-established technologies, an orientation-determining sensor, such as a gyroscope, accelerometer, or magnetic sensor, and optionally one or more other sensors such as a microphone (for voice commands, for example) or a biosensor. An inward-facing camera may be used for gaze direction determination. In some embodiments, a small sub-set of these sensors, such as the outward cameras, and one head positioning sensor, may be sufficient for sensor unit 402.

Sensor system 400 also includes control unit 404, comprising one or more processors, operably connected to sensor unit 402, memory system 405, and display device 406. The processor or processors within control unit 404 operates in conjunction with instructions and data from memory system 405, network system 408, and input interface system 410 (simple hardware devices such as a power button, a brightness control knob etc) to transform information gathered from sensor unit 402 into data usable by output control system of unit 404. This data is fed in turn to display 406 to generate the paired local and global user interfaces of the present invention. Some data may also be fed to ancillary devices such as a speaker, and some may be provided to network system 408, according to the particular applications being run.

Embodiments described herein provide various benefits to the user of an augmented reality system. In particular, embodiments enable a user to interact with the system intuitively and conveniently in real time, by augmenting the external environment with virtual images that may be either in a local user interface, or in a global user interface, paired with the local user interface, such that the local user interface remains stationary with respect to a part of the user's body, while the global user interface remains stationary with respect to objects in the external environment. These benefits may be especially valuable in engaging and maintaining user involvement in any of a variety of gaming, educational, and commercial or business applications.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for enhancing an augmented reality experience of a user having freedom of movement within an external environment, the method comprising:
   creating a local user interface and displaying the local user interface to the user in a first viewable region; and
   creating a global user interface and displaying the global user interface to the user in a second viewable region, wherein the second viewable region is positioned at a different depth relative to the user than the first viewable region, and wherein the global user interface is positioned further from the user than the local user interface, wherein the local user interface is maintained at a first spatial position, the first spatial position being stationary with respect to a part of a user's body, and wherein the global user interface is maintained at a second spatial position, the second spatial position being stationary with respect to the external environment;
   generating a virtual object in the global user interface, wherein the virtual object corresponds to an object in the local user interface; and
   enabling the user to control aspects of motion of the virtual object in the global user interface such that the virtual object in the global user interface appears to maneuver around or interact with one or more physical objects shown in the second viewable region of the global user interface.

2. The method of claim 1, wherein the local user interface comprises a first virtual image element, and wherein in response to the user selecting the first virtual image element and indicating by a gesture a desired position in the external environment, a corresponding second virtual image element is created and displayed in the global user interface at the desired position, as viewed by the user.

3. The method of claim 1, wherein the global user interface comprises a first virtual image element, and wherein in response to the user selecting the first virtual image element and indicating by a gesture a desired position in the first viewable region, a corresponding second virtual image element is created and displayed in the local user interface at the desired position, as viewed by the user.

4. The method of claim 2, wherein the second virtual image element is three dimensional, such that if the user changes position and orientation, correspondingly different features of the second virtual image element are perceived by the user.

5. The method of claim 2, wherein the second virtual image element is three dimensional, such that if the second virtual image element changes position and orientation in response to control, either by the user interacting with the global user interface or by software running the augmented reality experience, correspondingly different features of the second virtual image element are perceived by the user.

6. The method of claim 2, wherein the second virtual image element is perceived by the user to be opaque.

7. The method of claim 2, wherein the second virtual image element moves in the external environment in response to a deliberate gesture by the user, interacting with the global user interface.

8. The method of claim 1, wherein the displaying of the local user interface and the displaying of the global user interface are carried out using an optical head mounted display device worn by the user.

9. The method of claim 8, wherein the optical head mounted display device comprises:
   an OLED display;
   a head position sensor;
   a head orientation sensor; and
   first and second cameras directed outwards away from the user; and
   wherein the first and second cameras capture images in a visible range of an electromagnetic spectrum.

10. The method of claim 9, wherein distance from the user of a real object viewed by the user in the external environment is determined by image processing of images captured by the first and second cameras.

11. The method of claim 9, wherein an optical head mounted display further comprises a third camera directed towards the user, wherein the third camera captures images, in a visible range of an electromagnetic spectrum, of a user's eyeballs.

12. A system for enhancing an augmented reality experience of a user having freedom of movement within an external environment, the system comprising:
   a display device; and
   at least one processor coupled to the display device and configured to:
   create a local user interface;
   control a display to provide the local user interface to the user in a first viewable region;
   create a global user interface;
   control the display to provide the global user interface to the user in a second viewable region, wherein the second viewable region is positioned at a different depth relative to the user than the first viewable region, and wherein the global user interface is positioned further from the user than the local user interface;
   in response to movements of the user, further control the display device to:
   maintain the local user interface at a first spatial position, the first spatial position being stationary with respect to a part of a user's body;
   maintain the global user interface at a second spatial position, the second spatial position being stationary with respect to the external environment;
   generating a virtual object in the global user interface, wherein the virtual object corresponds to an object in the local user interface; and
   enabling the user to control aspects of motion of the virtual object in the global user interface such that the virtual object in the global user interface appears to maneuver around or interact with one or more physical objects shown in the second viewable region of the global user interface.

13. The system of claim 12, wherein the local user interface comprises a first virtual image element, and wherein in response to the user selecting the first virtual image element and indicating by a gesture a desired position in the external environment, a corresponding second virtual image element is created and displayed in the global user interface at the desired position, as viewed by the user.

14. The system of claim 12, wherein the global user interface comprises a first virtual image element, and wherein in response to the user selecting the first virtual image element and indicating by a gesture a desired position in the first viewable region, a corresponding second virtual image element is created and displayed in the local user interface at the desired position, as viewed by the user.

15. The system of claim 12, wherein displaying of the local user interface and displaying of the global user interface are carried out using an optical head mounted display device worn by the user the optical head mounted display device comprising:
   an OLED display;
   a head position sensor;
   a head orientation sensor; and
   first and second cameras directed outwards away from the user; and
   wherein the first and second cameras capture images in a visible range of an electromagnetic spectrum.

16. A non-transitory computer readable storage device including one or more instructions executable by one or more processors for enhancing an augmented reality experience of a user having freedom of movement within an external environment, the one or more instructions when executed being operable to perform:
   creating a local user interface and displaying the local user interface to the user in a first viewable region;
   creating a global user interface and displaying the global user interface to the user in a second viewable region, wherein the second viewable region is positioned at a different depth relative to the user than the first viewable region, and wherein the global user interface is positioned further from the user than the local user interface, wherein the local user interface is maintained at a first spatial position, the first spatial position being stationary with respect to a part of a user's body, and wherein the global user interface is maintained at a second spatial position, the second spatial position being stationary with respect to the external environment;
   generating a virtual object in the global user interface, wherein the virtual object corresponds to an object in the local user interface; and
   enabling the user to control aspects of motion of the virtual object in the global user interface such that the virtual object in the global user interface appears to maneuver around or interact with one or more physical objects shown in the second viewable region of the global user interface.

17. The non-transitory computer readable storage device of claim 16,
   wherein the local user interface comprises a first virtual image element, and wherein in response to the user selecting the first virtual image element and indicating by a gesture a desired position in the external environment, a corresponding second virtual image element is created and displayed in the global user interface at the desired position, as viewed by the user; and
   wherein the global user interface comprises a first virtual image element, and wherein in response to the user selecting the first virtual image element and indicating by a gesture a desired position in the first viewable region, a corresponding second virtual image element is created and displayed in the local user interface at the desired position, as viewed by the user.

18. The non-transitory computer readable storage device of claim 16, wherein the displaying of the local user interface and the displaying of the global user interface are carried out using an optical head mounted display device worn by the user the optical head mounted display device comprising:
   an OLED display;
   a head position sensor;
   a head orientation sensor; and
   first and second cameras directed outwards away from the user; and
   wherein the first and second cameras capture images in a visible range of an electromagnetic spectrum.

19. An apparatus comprising:
   means for creating a local user interface and a global user interface;
   means for displaying the local user interface in a first viewable region to a user having freedom of movement within an external environment; and
   means for displaying the global user interface to the user in a second viewable region further, wherein the second viewable region is positioned at a different depth relative to the user than the first viewable region, and wherein the global user interface is positioned further from the user than the local user interface, wherein the local user interface is maintained at a first spatial position, the first spatial position being stationary with respect to a part of a user's body, and wherein the global user interface is maintained at a second spatial position, the second spatial position being stationary with respect to the external environment;

generating a virtual object in the global user interface, wherein the virtual object corresponds to an object in the local user interface; and enabling the user to control aspects of motion of the virtual object in the global user interface such that the virtual object in the global user interface appears to maneuver around or interact with one or more physical objects shown in the second viewable region of the global user interface.

\* \* \* \* \*